United States Patent [19]

Taricco

[11] Patent Number: 5,783,929
[45] Date of Patent: Jul. 21, 1998

[54] APPARATUS AND METHOD FOR RECHARGING A BATTERY

[76] Inventor: Todd Taricco, P.O. Box 1547, Zephyr Cove, Nev. 89448

[21] Appl. No.: 835,034

[22] Filed: Mar. 27, 1997

[51] Int. Cl.⁶ .................................................. H02J 7/00
[52] U.S. Cl. ...................................... 320/139; 320/145
[58] Field of Search ............................ 320/1, 3, 4, 12, 320/21, 30, 32, 39, 61, 139, 145, 101; 324/426, 427, 428, 429, 430, 431, 432, 433; 363/157

[56] References Cited

U.S. PATENT DOCUMENTS

| | | | |
|---|---|---|---|
| 4,234,839 | 11/1980 | King et al. | 428/412 |
| 4,740,739 | 4/1988 | Quammen et al. | 320/129 |
| 4,871,959 | 10/1989 | Gali | 320/101 |
| 5,084,664 | 1/1992 | Gali | 320/101 |
| 5,146,395 | 9/1992 | McKie | 363/13 |
| 5,276,393 | 1/1994 | Gali | 320/101 |
| 5,444,354 | 8/1995 | Takahashi et al. | 322/28 |
| 5,541,495 | 7/1996 | Gali | 320/165 |
| 5,633,575 | 5/1997 | Gali | 320/140 |
| 5,648,714 | 7/1997 | Eryou et al. | 320/139 |

*Primary Examiner*—Adolf Berhane
*Assistant Examiner*—Gregory J. Toatley, Jr.
*Attorney, Agent, or Firm*—Blakely Sokoloff Taylor & Zafman

[57] ABSTRACT

An apparatus and method for recharging a battery. The invention includes modulating a rail voltage with a modulation signal that oscillates at a radio frequency, preferably at a frequency that matches the natural resonant frequency of the battery. The modulated rail voltage is provided to the battery to recharge the device. The apparatus may have a follower circuit which shifts the modulation frequency to follow any change in the natural resonant frequency of the battery.

15 Claims, 2 Drawing Sheets

5,783,929

1
APPARATUS AND METHOD FOR RECHARGING A BATTERY

BACKGROUND OF THE INVENTION

1. Field of the Invention

The present invention relates to an apparatus and method for recharging a battery.

2. Description of Related Art

A battery may be recharged by applying power to the device for a period of time. There have been developed various methods for applying power to recharge a battery. One method is to provide a continuous charging current that induces a change in the chemical composition of the battery. Such a method requires a relatively large charging current which tends to overheat and warp the battery plates. Additionally, it is has been found that a DC charge will not always fully restore the battery.

U.S. Pat. No. 4,740,739 issued to Quammen et al. discloses a method for charging a battery which includes the step of periodically allowing the battery to discharge during the charging process. In the Quammen method a continuous charging current is applied to the battery. The Quammen charging apparatus includes a pulse train generator and an electronic switch that are coupled to the battery. The pulse train generator periodically drives the switch so that a discharge current flows from the battery. The pulse train generator drives the switch every 600 to 1200 microseconds.

U.S. Pat. Nos. 4,871,959; 5,084,664 and 5,276,393 issued to Gali discloses a solar powered battery charger. The Gali battery chargers include a DC to AC converter which applies a pulsed current to the battery. The '393 patent discloses a waveform applied to the battery that is a series of very sharp pulses provided at a frequency between 10,000 and 100,000 hertz. The pulses have a rise time of less than 100 nanoseconds. Gali claims that this series of short pulses will generate a ringing signal in the battery that matches the resonant frequency of the battery. Gali further claims that the battery can be recharged with such pulses without providing a continuous charging current to the device. The low power requirements allow Gali to utilize a solar conversion energy source.

It has been found that the recharging methods of the prior art are not always successful in fully restoring a depleted battery. It would be desirable to provide an apparatus and method for fully restoring any battery.

SUMMARY OF THE INVENTION

The present invention is an apparatus and method for recharging a battery. The invention includes modulating a rail voltage with a modulation signal that oscillates at a radio frequency, preferably at a frequency that matches the natural resonant frequency of the battery. The modulated rail voltage is provided to the battery to recharge the device. The apparatus may have a follower circuit which shifts the modulation frequency to follow any change in the natural resonant frequency of the battery.

2
DETAILED DESCRIPTION OF THE INVENTION

Figure 1:
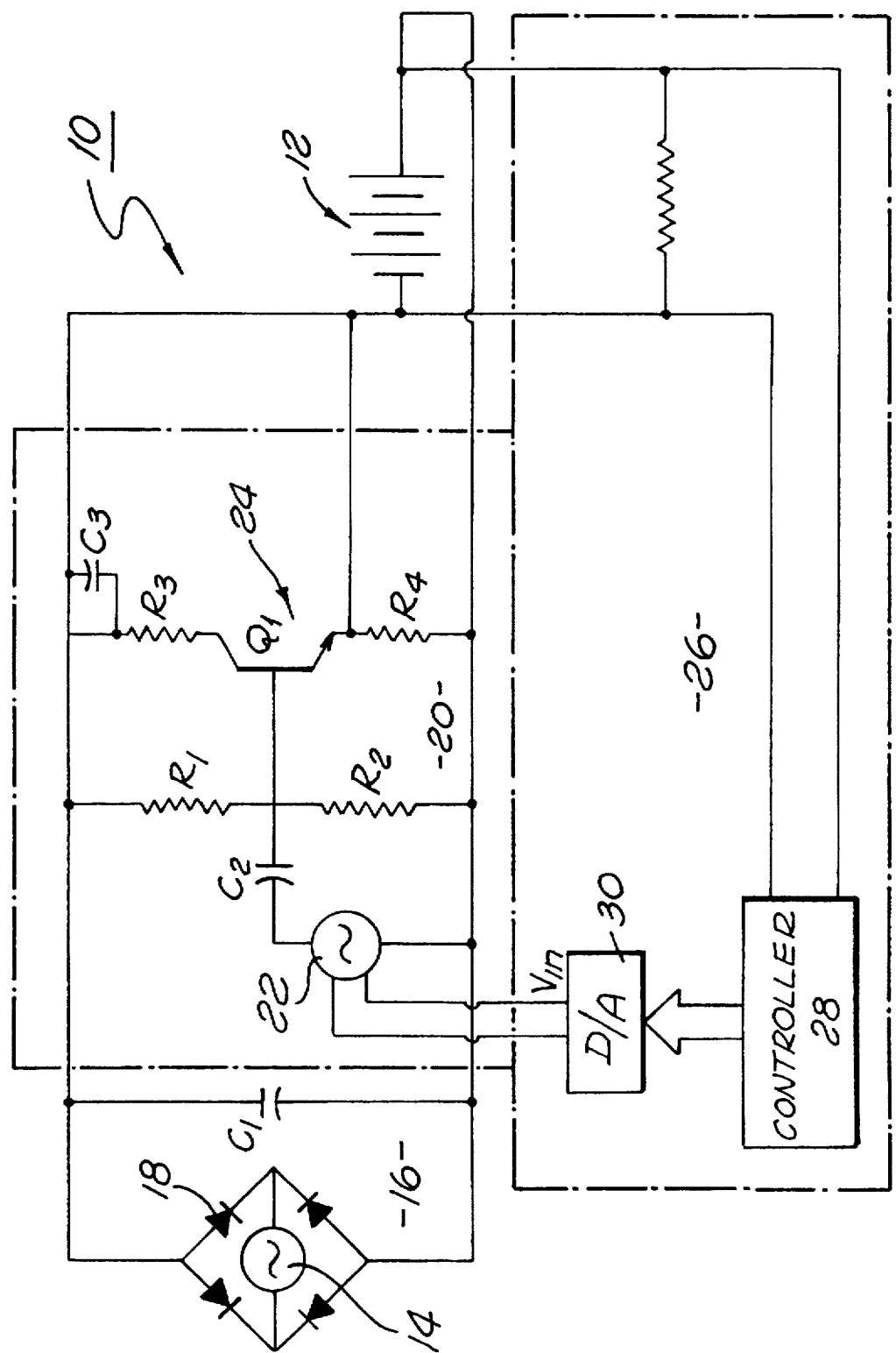
FIG. 1 is a schematic of an apparatus of the present invention.

Referring to the drawings more particularly by reference numbers, FIG. 1 shows a battery recharging apparatus 10 of the present invention. The apparatus 10 is used to recharge a battery 12. The battery 12 is typically a lead-acid DC battery that is used in vehicles such as automobiles or aircraft. Although it is to be understood that the present invention may be used to charge other types of batteries. The battery 12 is typically depleted so that is does not provide a sufficient current. The battery 12 contains plates, terminals, fluid, etc., which create a circuit that has a natural resonant frequency.

The apparatus 10 can be plugged into an AC power source 14 such as a municipal power line. The apparatus 10 includes a full wave rectifier 16 which converts an AC voltage from the power source 14 to a DC voltage, which will be referred to as the rail voltage. The rectifier 16 may include a plurality of diodes 18 and an output capacitor $C_1$ for rectifying the AC voltage and providing a constant rail voltage. The rail voltage is applied to the battery terminals. The battery 12 is thus provided with continuous charging current up to a maximum voltage for the battery temperature.

Figure 2:
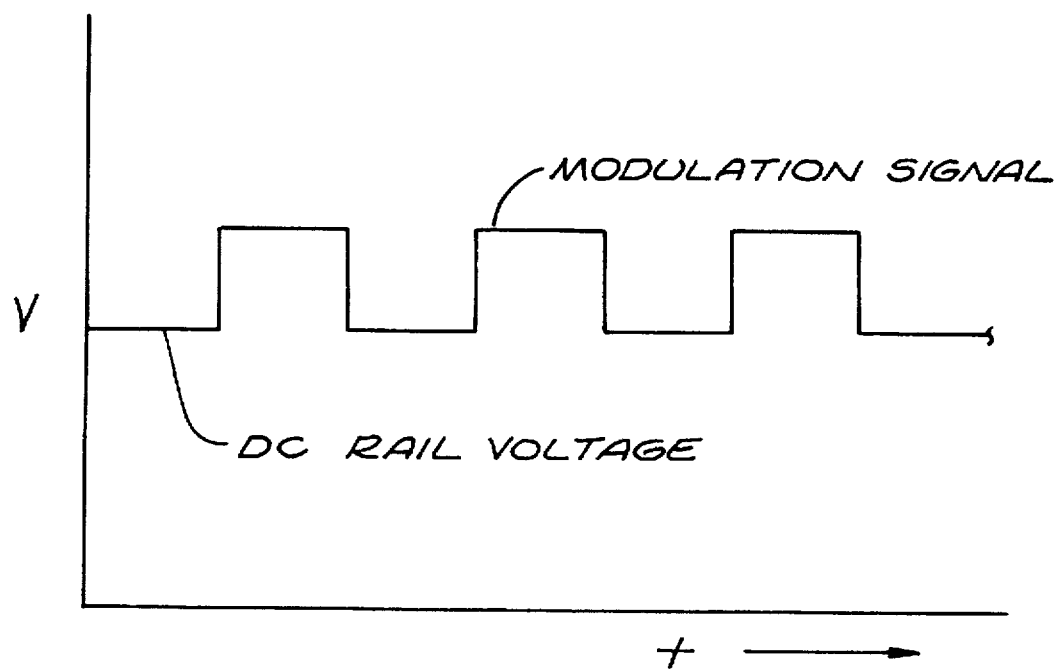
FIG. 2 is a graph showing a modulated rail voltage that is applied to a battery.

The capacitor $C_1$ is coupled to a modulation circuit 20 that modulates the rail voltage with a modulation signal. FIG. 2 shows the waveform of the voltage that is applied to the battery 12. The waveform includes a DC level and a modulation signal modulated onto the DC signal. In the preferred embodiment, the modulation signal oscillates at a frequency that corresponds to the natural resonant frequency of the battery 12. It has been found that such a modulated rail voltage will fully restore almost any discharged battery. In the preferred embodiment the modulation frequency is in the radio frequency range above 10,000 hertz. Although a frequency range between 10 and 40,000,000 hertz has been demonstrated to provide satisfactory results. It has been found that frequencies of 0.215, 0.312 and 0.612, 1.825 and 1.875 megahertz provide the best results when recharging a lead-acid battery. The rail voltage typically ranges between 1.2 to 50 volts, preferably at least 15 volts. In addition to the resonant frequency the output of the battery may include multiple harmonic frequencies.

The modulation circuit 20 may include an oscillator 22 which drives an electronic switch 24. The oscillator 22 may be a voltage controlled variable waveform generator that can provide a modulation signal having a desired waveform at a desired frequency. By way of example, the oscillator 22 may produce a square wave or a sawtooth waveform.

In the preferred embodiment the electronic switch 24 is a common collector emitter follower amplifier circuit which contains a npn bipolar junction transistor (BJT) $Q_1$. The base junction of the transistor $Q_1$ is connected to DC biasing resistors $R_1$ and $R_2$. The biasing resistors $R_1$ and $R_2$ are coupled to the oscillator 22 by a by-pass capacitor $C_2$. The collector junction of the transistor $Q_1$ is connected to a collector resistor $R_3$ and a by-pass capacitor $C_3$. The emitter junction of the transistor $Q_1$ is connected to a emitter resistor $R_4$. The emitter resistor $R_4$ is coupled to the battery 12.

The chemical composition of the battery changes during the charging process. This change may vary the resonant natural frequency of the battery 12. The apparatus 10 may further include a follower circuit 26 that varies the modulation frequency of the modulation signal to follow the natural resonant frequency of the battery 12. The follower circuit 26 may include a microcontroller 28 which has input terminals that sense the voltage of the battery 12 through resistor $R_5$. In the preferred embodiment the microcontroller 28 is a digital signal processor (DSP) which can analyze the battery voltage waveform. The controller 28 can analyze the waveform to determine whether the modulation signal is oscillating at the resonant frequency of the battery 12.

The microcontroller 28 can provide output commands to vary the modulation frequency generated by the oscillator 22. The microcontroller 28 may be coupled to the oscillator 22 by a digital to analog (D/A) converter 30. The controller 28 provides an output command in a binary format which is converted by the D/A 30 to an analog signal that is the input voltage $V_{in}$ for the oscillator 22.

In operation, the controller 28 may initiate a frequency sweep by varying the modulation frequency of the modulation signal in accordance with a predetermined algorithm. The controller 28 may also sense the voltage of the battery 12 to determine the natural resonant frequency of the device 12. The controller 28 can then provide output commands so that the oscillator 22 generates a modulation signal at the resonant frequency. If the controller 28 senses a change in the natural resonant frequency, the controller 28 can initiate another sweep to again determine the resonant frequency. The secondary sweep typically has a smaller range than the initial sweep. The controller 28 can continue this routine until the battery 12 is sufficiently recharged.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Figure 3:
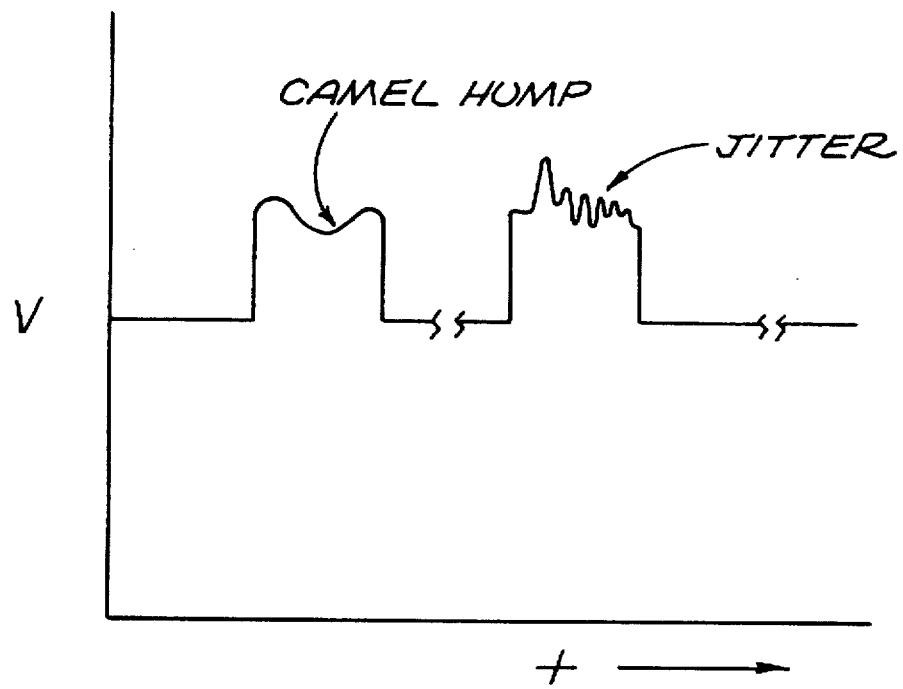
FIG. 3 is a graph showing an output voltage of the battery during the process of recharging.

For example, FIG. 3 shows output signals measured from the battery. Modulation frequencies which create a camel hump or jitter have been found to efficiently recharge a battery 12. The controller 28 can therefore analyze the waveform to determine the existence of a camel hump and/or jitter and then lock into the modulation signal that produced the desired waveform characteristics.

What is claimed is:

1. An apparatus that recharges a battery which has a natural resonant frequency, comprising:

a recharger circuit that provides a rail voltage to the battery that is modulated with a modulation signal which oscillates at a frequency that is approximately the natural resonant frequency of the battery.

2. The apparatus as recited in claim 1, wherein said modulation frequency is above 10,000 hertz.

3. The apparatus as recited in claim 2, wherein said modulation frequency is in the megahertz frequency range.

4. The apparatus as recited in claim 1, wherein said recharger circuit includes a frequency follower which varies said modulation frequency to follow a change in the natural resonant frequency of the battery as the battery is being recharged.

5. The apparatus as recited in claim 1, wherein said recharger circuit includes a modulator circuit that modulates said rail voltage.

6. The apparatus as recited in claim 5, wherein said modulator circuit includes a waveform generator.

7. The apparatus as recited in claim 5, wherein said waveform generator generates a sawtooth wave.

8. The apparatus as recited in claim 5, wherein said waveform generator generates a square wave.

9. An apparatus that recharges a battery, comprising:

a recharger circuit that provides a rail voltage to the battery that is continuously modulated by a modulator signal which oscillates at a radio frequency.

10. The apparatus as recited in claim 9, wherein said recharger circuit includes a follower circuit which varies said modulator signal frequency to follow a changing natural resonant frequency of the battery as the battery is being recharged.

11. The apparatus as recited in claim 9, wherein said recharger circuit includes a waveform generator.

12. The apparatus as recited in claim 11, wherein said waveform generator generates a square wave.

13. A method for recharging a battery which has a natural resonant frequency, comprising the steps of:

a) applying a rail voltage to the battery; and b) modulating said rail voltage with a modulation signal which oscillates at a frequency that is approximately the natural resonant frequency of the battery.

14. The method as recited in claim 13, wherein said modulation frequency is varied to follow a change in the natural resonant frequency of the battery as the battery is recharging.

15. A method for recharging a battery, comprising the steps of:

a) applying a rail voltage to the battery; and, b) modulating said rail voltage with a modulation signal which oscillates at a radio frequency.

\* \* \* \* \*

UNITED STATES PATENT AND TRADEMARK OFFICE
CERTIFICATE OF CORRECTION

PATENT NO. : 5,783,929
DATED : July 21, 1998
INVENTOR(S) : Taricco

It is certified that error appears in the above-identified patent and that said Letters Patent is hereby corrected as shown below:

In the title page, item [76] Inventor, please insert -- William David Killebrew, P.O. Box 4710, Lake Tahoe, Nev. 89449 --.

Signed and Sealed this

Seventeenth Day of November, 1998

Attest:

BRUCE LEHMAN

*Attesting Officer*    *Commissioner of Patents and Trademarks*